R. E. McINTIRE.
POWER TRANSMISSION MECHANISM.
APPLICATION FILED JULY 9, 1913.
1,170,082.
Patented Feb. 1, 1916.
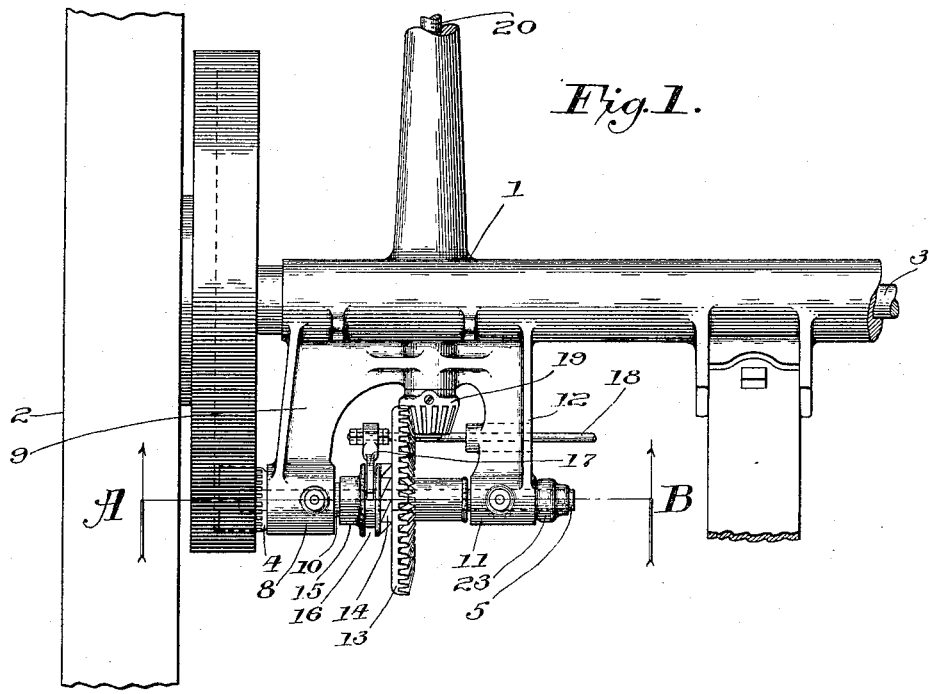
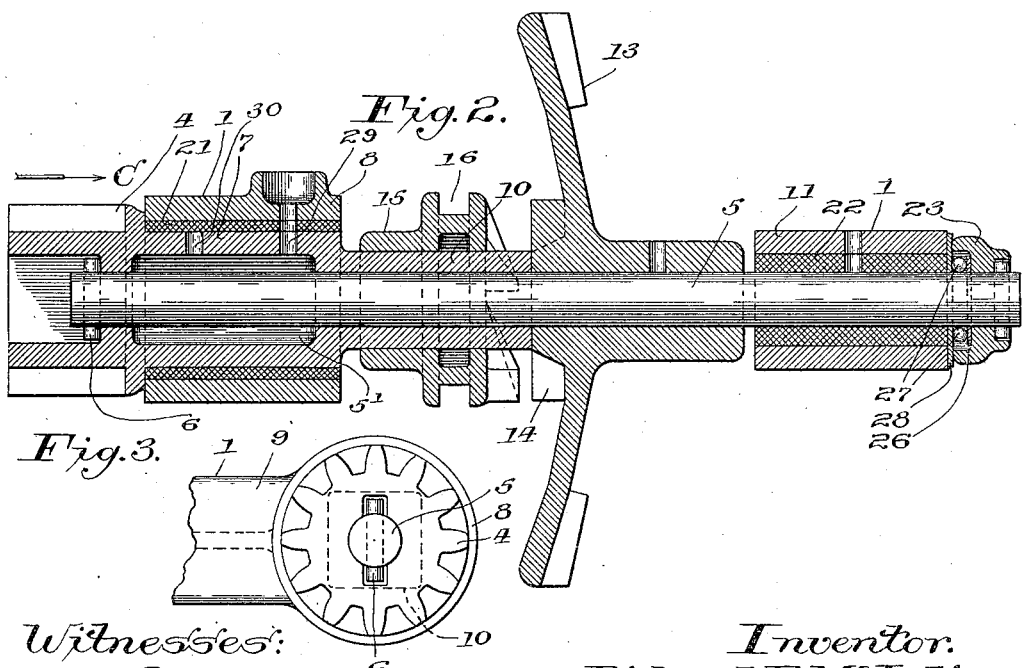
Witnesses:
C. C. Palmer
Inventor.
Richard E. McIntire,
By Chas. E. Lord
Atty.

UNITED STATES PATENT OFFICE.

RICHARD E. McINTIRE, OF CHICAGO, ILLINOIS, ASSIGNOR TO INTERNATIONAL HARVESTER COMPANY OF NEW JERSEY, A CORPORATION OF NEW JERSEY.

POWER-TRANSMISSION MECHANISM.

1,170,082.  Specification of Letters Patent.  Patented Feb. 1, 1916.

Application filed July 9, 1913. Serial No. 778,015.

*To all whom it may concern:*

Be it known that I, RICHARD E. McINTIRE, a citizen of the United States, residing at Chicago, in the county of Cook and State of Illinois, have invented certain new and useful Improvements in Power-Transmission Mechanism, of which the following is a full, clear, and exact specification.

My invention relates to mowing machines, and in particular to the power transmission mechanism between the traction wheels and the cutting apparatus, such mechanism including a clutch operative in connection with the power transmission mechanism to cause engagement or disengagement of associated parts of the mechanism.

The objects of my invention is to provide a construction that is simple, cheaply made, durable and efficient in operation. I attain these objects by means of the mechanism illustrated by the accompanying drawings, in which—

Figure 1 is a top plan view of part of the main frame of a mowing machine and having my invention forming a part thereof; Fig. 2 is a vertical sectional elevation of part of Fig. 1 along line A—B; and Fig. 3 is an end elevation of part of Fig. 2 in the direction of the arrow C.

The same reference characters designate like parts throughout the several views.

1 represents a part of the main frame of a mowing machine, 2 one of the traction wheels journaled upon a transverse axle 3 and having a gear member secured thereto that engages with a pinion 4 integral with a bearing sleeve that is mounted upon one end of the cross shaft 5. This sleeve is provided with an oil chamber or reservoir 5' surrounding the shaft, the sleeve being connected with the shaft by means of a pin 6 and having a cylindrical bearing portion 7 journaled in a bearing box 8 forming part of a rearwardly projecting arm 9 integral with the main frame 1 and an angular portion 10 extending axially from the part 7. The opposite end of the shaft 5 is journaled in a bearing box 11 forming part of an arm 12 extending rearwardly from the frame 1. 13 represents a gear wheel journaled upon the shaft between the bearing box 11 and the angular extension 10. The gear wheel 13 is provided with a clutch member 14 that is adapted to engage with a clutch member 15 slidably mounted upon the angular portion 10 of the sleeve member and having a circumferential groove 16 that receives a clutch shifting fork 17, that is carried by a rod 18, that is slidably mounted upon the arm 12.

19 represents a pinion secured to the rear end of a longitudinally arranged shaft 20 and intermeshing with the gear wheel 13.

The clutch member 15 is movable into and out of engagement with the gear wheel 13 in a common way.

The bearing boxes 8 and 11 are provided with bronze bushings 21 and 22 respectively having oil ducts communicating with a source of supply, and 23 represents a collar secured to the shaft 5 and having a counterbore portion that receives a washer 26 and balls 27 that are disposed between the washer 26 and a washer 28 adjacent the bearing box 11. The bearing portion 7 is provided with an oil duct 29 that communicates with the duct in the bushing intermittently, and one or more ducts 30 near the opposite end of the oil chamber that permit oil to flow from the reservoir 5' to the bearing as the sleeve revolves.

Although I have illustrated and described one embodiment of my invention, modifications may be made therein without departing from the spirit of my invention as set forth in the appended claims.

What I claim as my invention, and desire to secure by Letters Patent, is:

1. A power transmitting device comprising a pinion having integral therewith a cylindrical chambered bearing member terminating in an angular extension.

2. A power transmitting mechanism including, in combination, a pinion having integral therewith a cylindrical chambered bearing member terminating in an angular extension, and a bearing box surrounding said bearing member.

3. A power transmitting mechanism including, in combination, a pinion having integral therewith a cylindrical bearing member terminating in an angular extension, and a clutch member slidably mounted upon said angular extension.

4. A power transmitting mechanism including, in combination, a pinion having integral therewith a cylindrical chambered bearing member terminating in an angular extension, and a shaft extending longitudinally through said extension and bearing member.

5. A power transmitting mechanism including, in combination, a shaft, a pinion secured to said shaft, said pinion having integral therewith a cylindrical bearing member terminating in an angular extension, a gear member journaled upon said shaft and provided with clutch teeth, and a clutch member slidably mounted upon said angular extension and adapted to engage with said clutch teeth.

6. In a mower, a frame having parallel extensions thereon, alined bearing boxes carried on said extensions, a shaft extending through said bearing boxes, a gear rotatably mounted on said shaft between said boxes, a pinion journaled in one of said bearing boxes having an angular extension extending into close proximity to said gear, said pinion and extension inclosing one end of said shaft, coöperating clutch mechanism carried on said gear and said extension, driving mechanism for said pinion carried by said frame, and driven mechanism operatively connected to said gear and journaled on said frame.

In testimony whereof I affix my signature, in the presence of two witnesses.

RICHARD E. McINTIRE.

Witnesses:
J. W. LINDQUIST,
H. STUDEMEYER.